US007563298B2

(12) United States Patent
Oh

(10) Patent No.: US 7,563,298 B2
(45) Date of Patent: Jul. 21, 2009

(54) CYCLONE DIRT SEPARATING APPARATUS AND VACUUM CLEANER HAVING THE SAME

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 539 days.

(21) Appl. No.: 11/372,860

(22) Filed: Mar. 10, 2006

(65) Prior Publication Data

US 2007/0011999 A1 Jan. 18, 2007

(30) Foreign Application Priority Data

Jul. 18, 2005 (KR) ...................... 10-2005-0064809

(51) Int. Cl.
*B01D 45/00* (2006.01)

(52) U.S. Cl. ............................ 55/343; 55/337; 55/345; 55/428; 55/429; 55/459.1; 55/DIG. 3; 55/426; 15/350; 15/353

(58) Field of Classification Search ................... 55/337, 55/345, 428, 429, 343, 349, 426, 459.1, DIG. 3; 15/350, 353
See application file for complete search history.

(56) References Cited

U.S. PATENT DOCUMENTS

| | | | | |
|---|---|---|---|---|
| 6,269,518 | B1 * | 8/2001 | Yung | 15/352 |
| 6,341,404 | B1 * | 1/2002 | Salo et al. | 15/353 |
| 6,428,589 | B1 | 8/2002 | Bair et al. | 55/318 |
| 7,429,284 | B2 * | 9/2008 | Oh et al. | 55/343 |
| 2005/0125940 | A1 * | 6/2005 | McDowell | 15/353 |
| 2005/0223520 | A1 * | 10/2005 | Greene et al. | 15/353 |

FOREIGN PATENT DOCUMENTS

| | | |
|---|---|---|
| EP | 0885585 | 12/1998 |
| EP | 1488729 | 12/2004 |
| FR | 2812184 | 2/2002 |
| FR | 2859373 | 3/2005 |

OTHER PUBLICATIONS

Search Report dated Nov. 23, 2007 corresponding to European Patent Application No. 06290535.1, 8 pages.

* cited by examiner

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A cyclone dirt separating apparatus and a vacuum cleaner having the same are disclosed. The cyclone dirt separating apparatus comprises a cyclone body including a first cyclone chamber in which dirt is separated preliminarily from air drawn in from an exterior by a centrifugal force; and a second cyclone chamber in which dirt is separated secondarily from the air discharged from the first cyclone chamber; and a dirt collecting case coupled to a lower end of the cyclone body for collecting the dirt. Also, the cyclone dirt separating apparatus further comprises a discharge guide duct passed through the cyclone body and the dirt collecting case and guiding the air discharged from the second cyclone chamber. Therefore, the air discharged through the discharge guide duct is directly entered to a motor mounting space of the vacuum cleaner.

13 Claims, 6 Drawing Sheets

CYCLONE DIRT SEPARATING APPARATUS AND VACUUM CLEANER HAVING THE SAME

CROSS-REFERENCE TO RELATED APPLICATIONS

This application claims benefit under 35 U.S.C. § 119(a) of Korean Patent Application No. 2005-64809, filed Jul. 18, 2005, the entire contents of which are incorporated herein by reference.

BACKGROUND OF THE INVENTION

1. Field of the Invention

The present invention relates to a vacuum cleaner. More particularly, the present invention relates to a cyclone dirt separating apparatus, which is applicable to a vacuum cleaner and filters dirt drawn in together with air using a centrifugal force in two or more steps and a vacuum cleaner with the same.

2. Description of the Related Art

A cyclone dirt separating apparatus has a structure by which a circular air current is formed in a cyclone chamber to separate the dirt from the air using a centrifugal force, the dirt is collected and the clean air is discharged to an exterior. Recently, in order to enhance the dirt collection efficiency, a multi cyclone dirt separating apparatus, which separates the dirt contained in the air in at least two steps, has been introduced.

FIG. 1 and FIG. 2 are views showing one example of a cyclone dirt separating apparatus disclosed in Korean Patent Application No. 2003-62520 filed in the name of the same applicant. FIG. 1 is a schematic perspective view of the upright type vacuum cleaner to which the multi cyclone dirt separating apparatus is applied and FIG. 2 is an exploded perspective view of the multi cyclone dirt separating apparatus in FIG. 1.

A motor mounting space 23 is provided in a main body 21 of the vacuum cleaner. A suction nozzle 24 is connected to a lower side of the main body 21 of the vacuum cleaner and a cyclone mounting section 22 is provided at a center portion of a front side of the main body 21 of the vacuum cleaner. On the other hand, an air suction passage 25 and an air discharge passage 26 are formed at a rear side of the cyclone mounting section 22 in a substantially vertical direction. Once a multi cyclone dirt separating apparatus 10 is mounted to the cyclone mounting section 22, the air suction passage 25 and the air discharge passage 26 are in fluid communication with an air inlet tube 11 and an air outlet tube 12, respectively.

Referring to FIG. 2, the multi cyclone dirt separating apparatus 10 comprises a first cyclone 13 for preliminarily separating dirt from the drawn-in air and a plurality of second cyclones 14 at a periphery of the first cyclone 13 for surrounding the first cyclone 13. And, the multi cyclone dirt separating apparatus 10 further comprises an air outlet port 15 formed at an upper side of the first cyclone 13 and the second cyclones 14; an inflowing/outflowing cover 17 communicating air inlet ports 16 of the second cyclones 14 with each other; a cyclone cover 18 provided on the inflowing/outflowing cover 17 and having the air outlet tube 12 formed thereon; and a dirt collecting case 19 for collecting dirt separated from the air in the first and second cyclones 13 and 14.

An operation of the multi cyclone dirt separating apparatus 10 and the vacuum cleaner having the structure as described above is described as follows.

First, once a suction force is generated in the main body 21 of the vacuum cleaner, the air containing dirt is passed through the suction nozzle 24 and the air suction passage 25 and then enters the multi cyclone dirt separating apparatus 10 through the air inlet tube 11.

Air passed through the air inlet tube 11 enters the first cyclone 13 in a tangential direction. A circular current is formed by the air while the air descends, and large sized dirt is separated from the air to collect in the dirt collecting case 19. The air from which the large sized dirt is separated ascends again and is discharged through the air outlet port 15 of the first cyclone 13. The air is then passed through an air passage (not shown) of the inflowing/outflowing cover 17 and enters each second cyclone 14 through the air inlet port 16. And, the air in the second cyclone 14 forms a circular current again and descends, small sized dirt separated from the air is collected in the dirt collecting case 19.

The air from which the small sized dirt is separated ascends and is passed through each discharge passage 17*a* of the inflowing/outflowing cover 17 and then collected in the cyclone cover 18. The air is discharged to an exterior of the multi cyclone dirt separating apparatus 10 via the air outlet tube 12 formed on the cyclone cover 18. Thereafter, the air is passed through the air discharge passage 26 and the motor mounting space 23 and then discharged to an exterior of the main body 21 of the vacuum cleaner.

However, the conventional multi cyclone dirt separating apparatus with the structure as mentioned above has the drawbacks as follows.

First, the air inlet tube 11 through which the air is entered is provided at an upper side wall of the first and second cyclones 13 and 14, and, in general, the air outlet tube 12 through which the air is discharged is provided at an upper side or a side portion of the cyclone cover 18 covering the first and second cyclones 13 and 14. However, since the above structure causes the problems that an entire height of the multi cyclone dirt separating apparatus 10 is increased, it is hard to design a compact canister type vacuum cleaner.

Second, the motor used for the vacuum cleaner, in particular, the upright vacuum cleaner is very heavy in weight, and so the motor mounting space 23 is provided generally at a lower side of the main body 21 of the vacuum cleaner. Accordingly, the motor mounting space 23 is located at a lower side of the cyclone mounting section 22. On the other hand, since the air outlet tube 12 is placed at an upper side of the multi cyclone dirt separating apparatus 10, the air discharging passage 26 communicating the motor mounting space 23 with the air outlet tube 12 should have a long length. Due to this constitution, a loss of suction force generated in the motor mounting space 23 is increased, and so a pressure loss is increased. Also, an inner structure of the main body 21 of the vacuum cleaner becomes complicated.

SUMMARY OF THE INVENTION

An aspect of the present invention is to solve at least the above problems and/or disadvantages and to provide at least the advantages described below. Accordingly, an object of the present invention is to provide a cyclone dirt separating apparatus having a compact structure constituted by improving a discharging passage through which air discharged from a cyclone dirt separating apparatus enters a motor mounting space. Also, another object of the present invention is to provide an improved vacuum cleaner, which has a simple structure and a reduced pressure loss obtained by applying the cyclone dirt separating apparatus.

According to one embodiment proposed to achieve the above-described aspect, there is provided a cyclone dirt separating apparatus, comprising a cyclone body including a first cyclone chamber in which dirt is separated preliminarily from air drawn from an exterior by a centrifugal force; and a second cyclone chamber in which dirt is separated secondarily from the air discharged from the first cyclone chamber; a dirt collecting case coupled to a lower end of the cyclone body for collecting the dirt separated from the air; and a discharge guide duct passing through the cyclone body and the dirt collecting case, the discharging guide duct guiding the air discharged from the second cyclone chamber to a motor mounting space.

It is preferable that the discharge guide duct penetrates through a side of the cyclone body and penetrates through the dirt collecting case in the substantially vertical direction.

Further, it is preferable that a lower end of the discharge guide duct contacts an inlet of a motor mounting space of a vacuum cleaner through a lower end thereof.

On the other hand, the cyclone dirt separating apparatus further comprises an inflowing/outflowing cover provided at an upper end of the cyclone body and provided with inflow guide passages for guiding the air discharged from the first cyclone chamber to the second cyclone chamber and the outflow guide passages for discharging the air in the second cyclone chamber to an exterior; and a cyclone cover provided on the inflowing/outflowing cover for gathering the air discharged from the outflow guide passages, wherein it is preferable that the inflowing/outflowing cover has a guide duct inlet for making the air gathered in the cyclone cover enter the discharge guide duct.

It is preferable that the discharge guide duct comprises a first guide duct passing through the cyclone body in a substantially vertical direction and communicating with the guide duct inlet and a second guide duct passing through the dirt collecting case in a substantially vertical direction and communicating the first guide duct.

The cyclone body has the first cyclone chamber provided at a center portion thereof, the second cyclone chambers are disposed at a periphery of the first cyclone chamber at regular intervals, and the first guide duct is formed at a region at which the second cyclone chambers are not provided.

In addition, the cyclone dirt separating apparatus may further comprise an inlet port passed through the cyclone body in a substantially horizontal direction to make the exterior air enter to the first cyclone chamber, the inlet port being formed at a side of the first guide duct.

Further, a flow direction of the air in the inlet port is substantially perpendicular to a flow direction of the air in the first guide duct.

According to another embodiment proposed to achieve the above-described aspect, there is provided a cyclone dirt separating apparatus comprising: a cyclone body including a cyclone chamber in which dirt is separated from entered air; an inlet port through which the exterior air enters the cyclone chamber; and an outlet port through which the air is discharged from the cyclone chamber; a dirt collecting case coupled to a lower end of the cyclone body for collecting the dirt separated from the air; and a discharge guide duct passing through the cyclone body and the dirt collecting case in a substantially vertical direction, the discharging guide duct guiding the air discharged from the outlet port to a lower end of the dirt collecting case.

Here, a lower end of the discharge guide duct contacts with an inlet of a motor mounting space of a vacuum cleaner.

The cyclone dirt separating apparatus further comprises a cover unit provided at an upper end of the cyclone body, wherein the cover unit has a guide duct inlet for making the air discharged from the outlet port enter the discharge guide duct.

According to a further embodiment proposed to achieve the above-described aspect, there is provided a vacuum cleaner comprising: a cyclone mounting section, a main body including a motor mounting space installed at a lower end of the cyclone mounting section, a suction nozzle coupled with the main body and a cyclone dirt separating apparatus mounted attachably/detachably to the cyclone mounting section.

The cyclone dirt separating apparatus comprises: a cyclone body including a first cyclone chamber in which dirt is separated preliminarily from air drawn in through the suction nozzle by a centrifugal force; and a plurality of second cyclone chambers disposed at a periphery of the first cyclone chamber for centrifugally separating dirt from the air discharged from the first cyclone chamber; a dirt collecting case coupled to a lower end of the cyclone body for collecting the dirt separated from the air; and a discharge guide duct passing through the cyclone body and the dirt collecting case, the discharging guide duct guiding the air discharged from the second cyclone chamber such that the air directly enters the motor mounting space.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
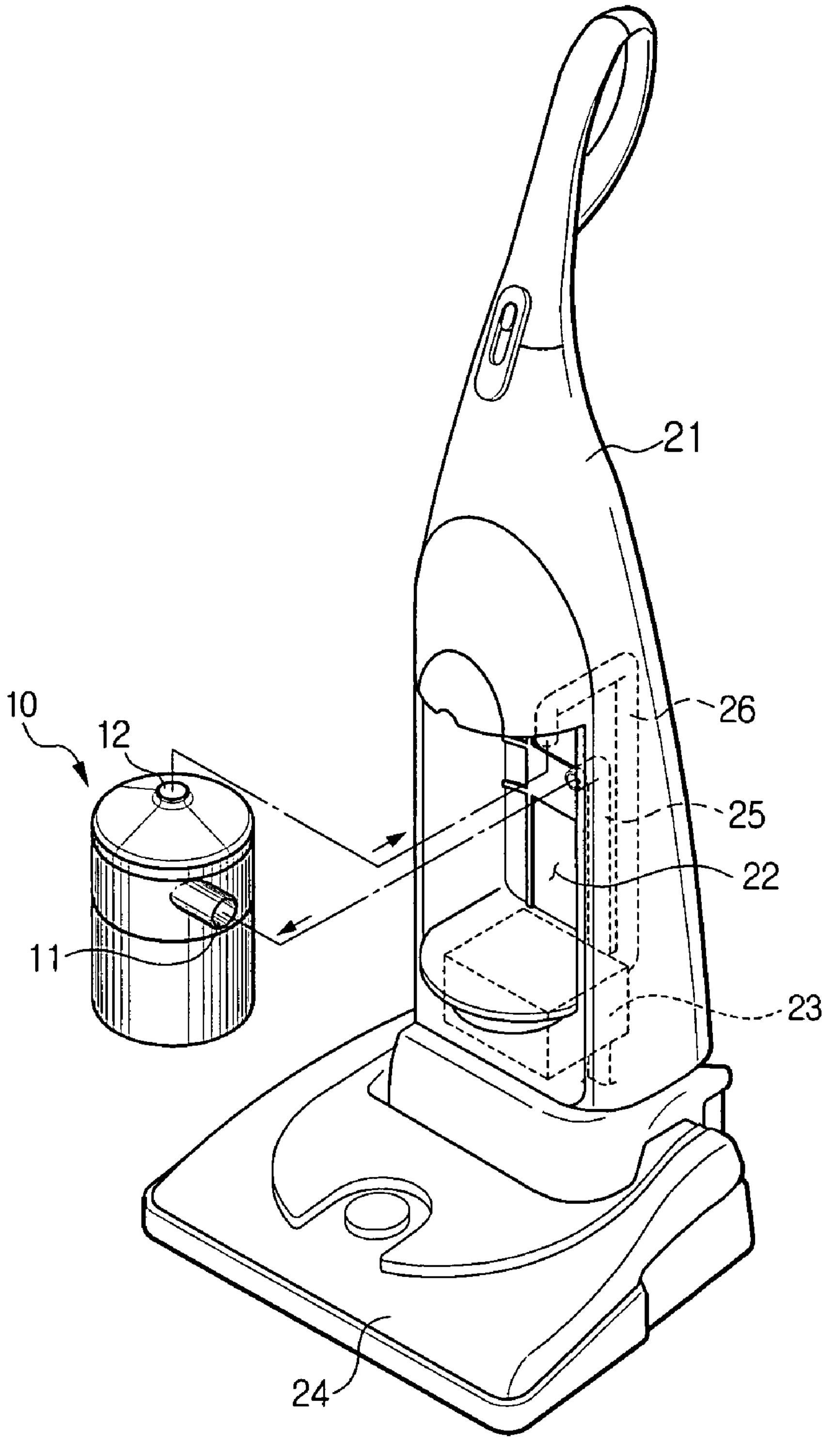
FIG. 1 (PRIOR ART)
FIG. 1 is a schematic perspective view of an upright-type vacuum cleaner having a multi cyclone dirt separating apparatus according to the related art.
Figure 2:
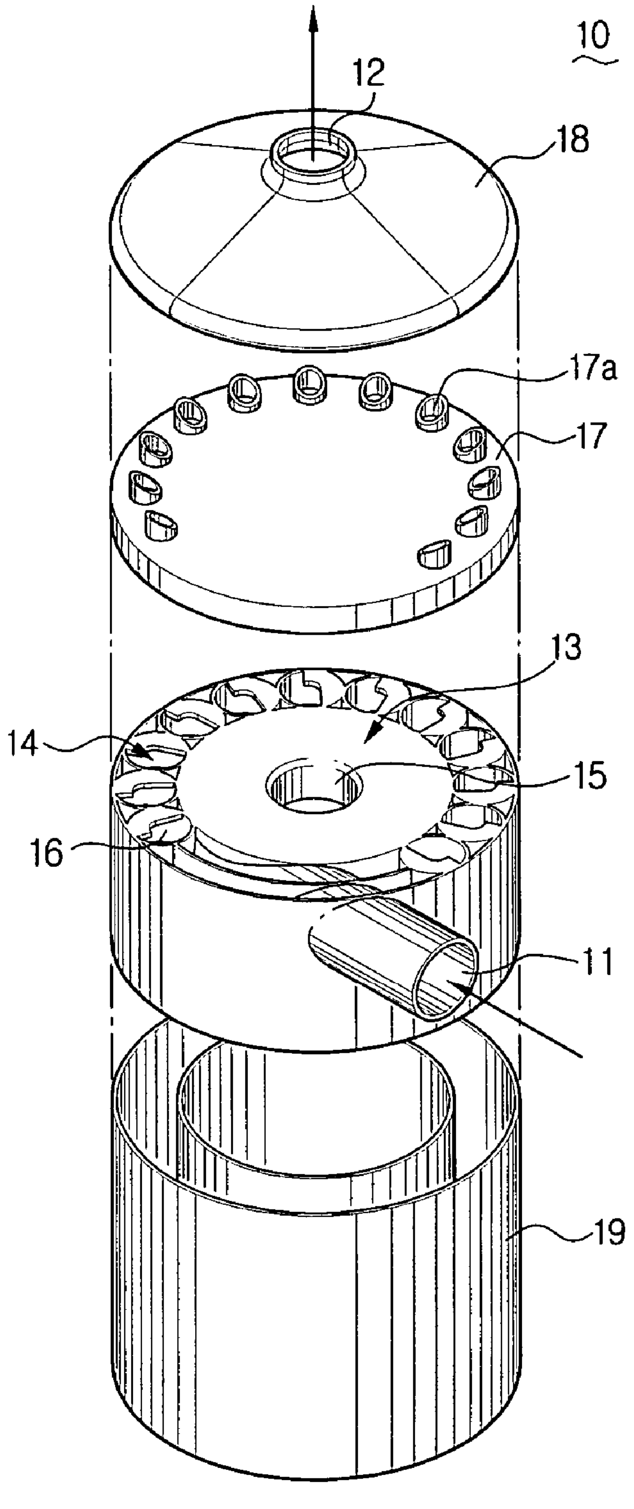
FIG. 2 (PRIOR ART)
FIG. 2 is an exploded perspective view of the multi cyclone dirt separating apparatus in FIG. 1.

Hereinafter, a cyclone dirt separating apparatus and a vacuum cleaner using the same according to the preferred embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
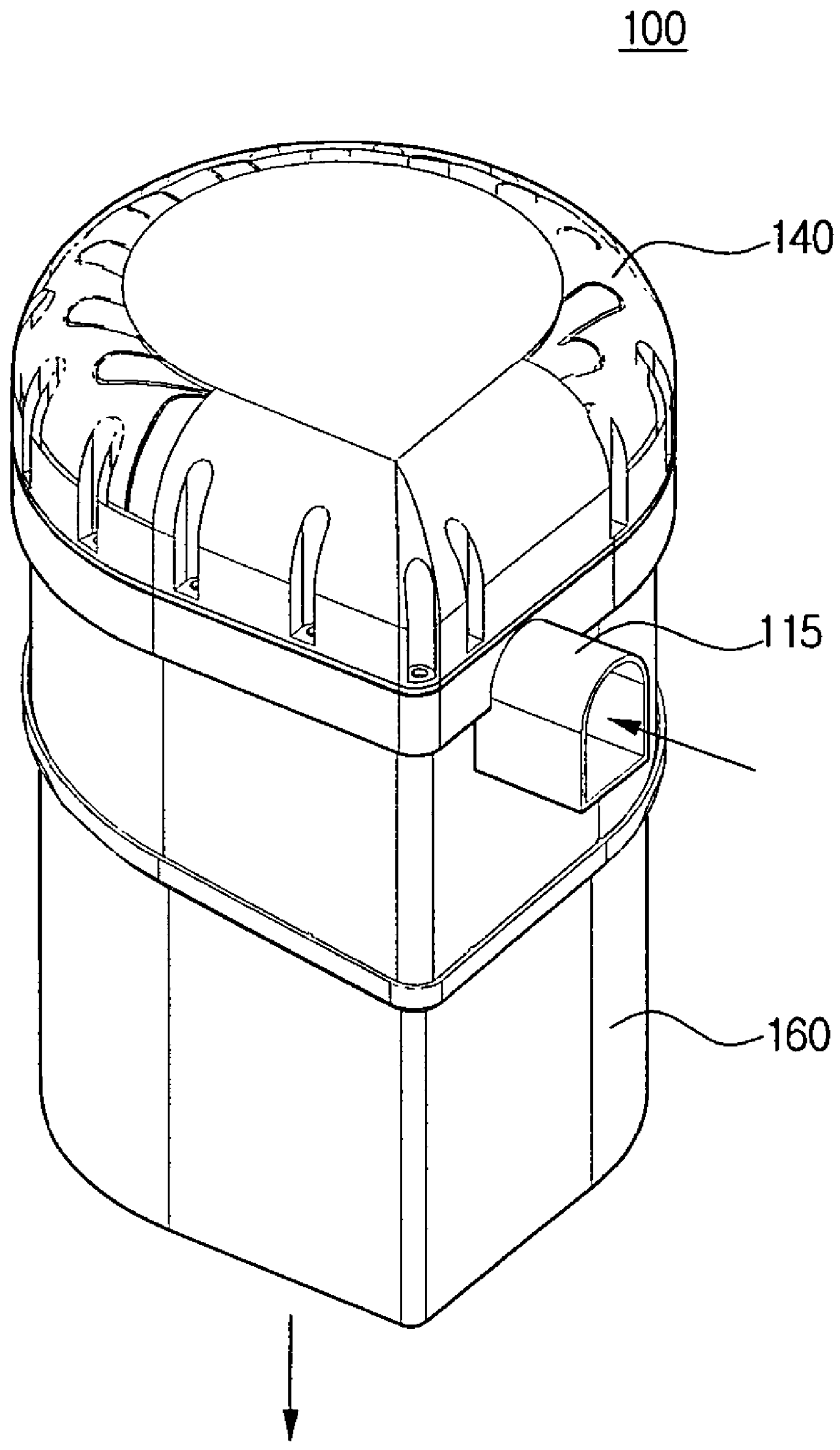
FIG. 3 is a perspective view of a multi cyclone dirt separating apparatus in accordance with an exemplary embodiment of the present invention.
Figure 4:
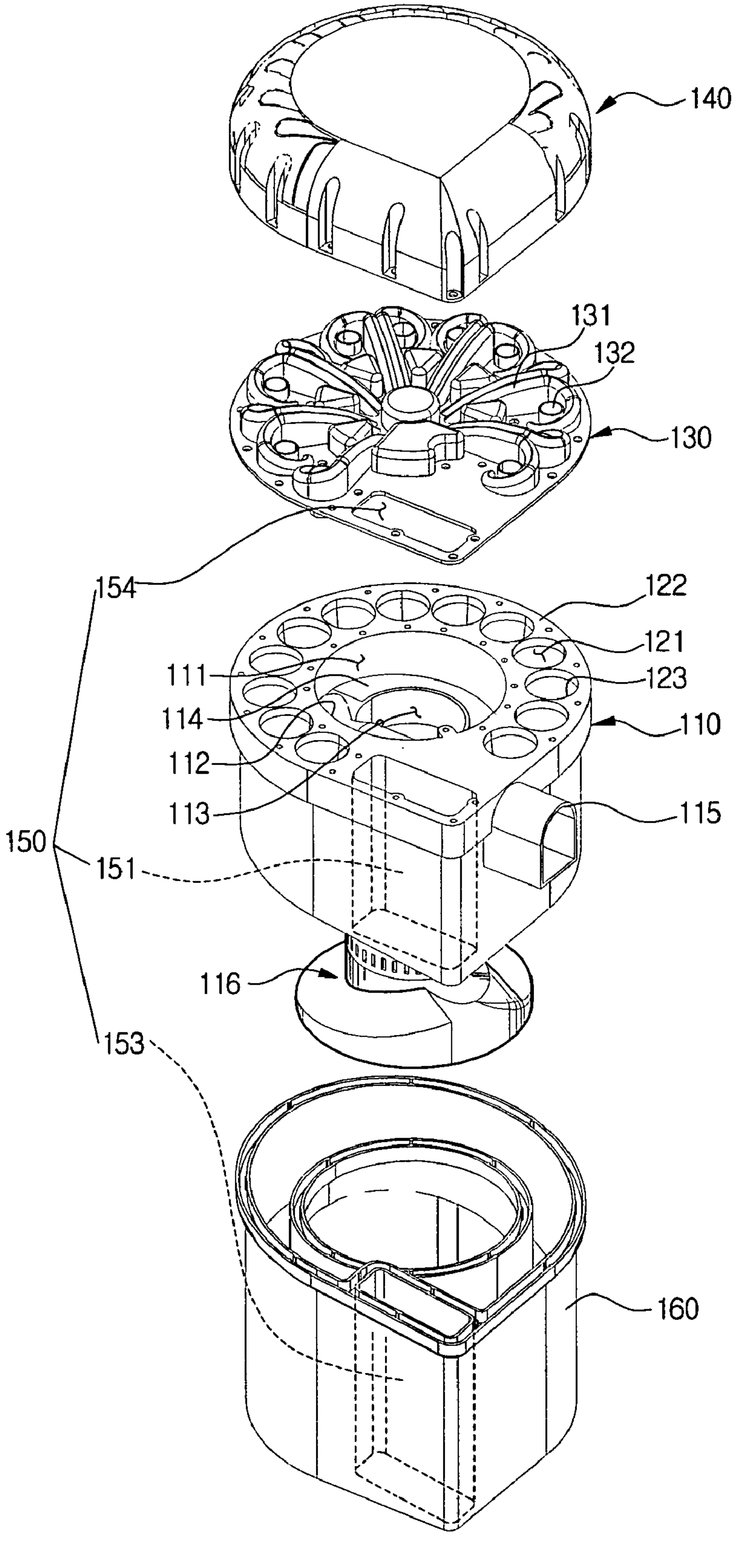
FIG. 4 is an exploded perspective view of the multi cyclone dirt separating apparatus in FIG. 3.
Figure 5:
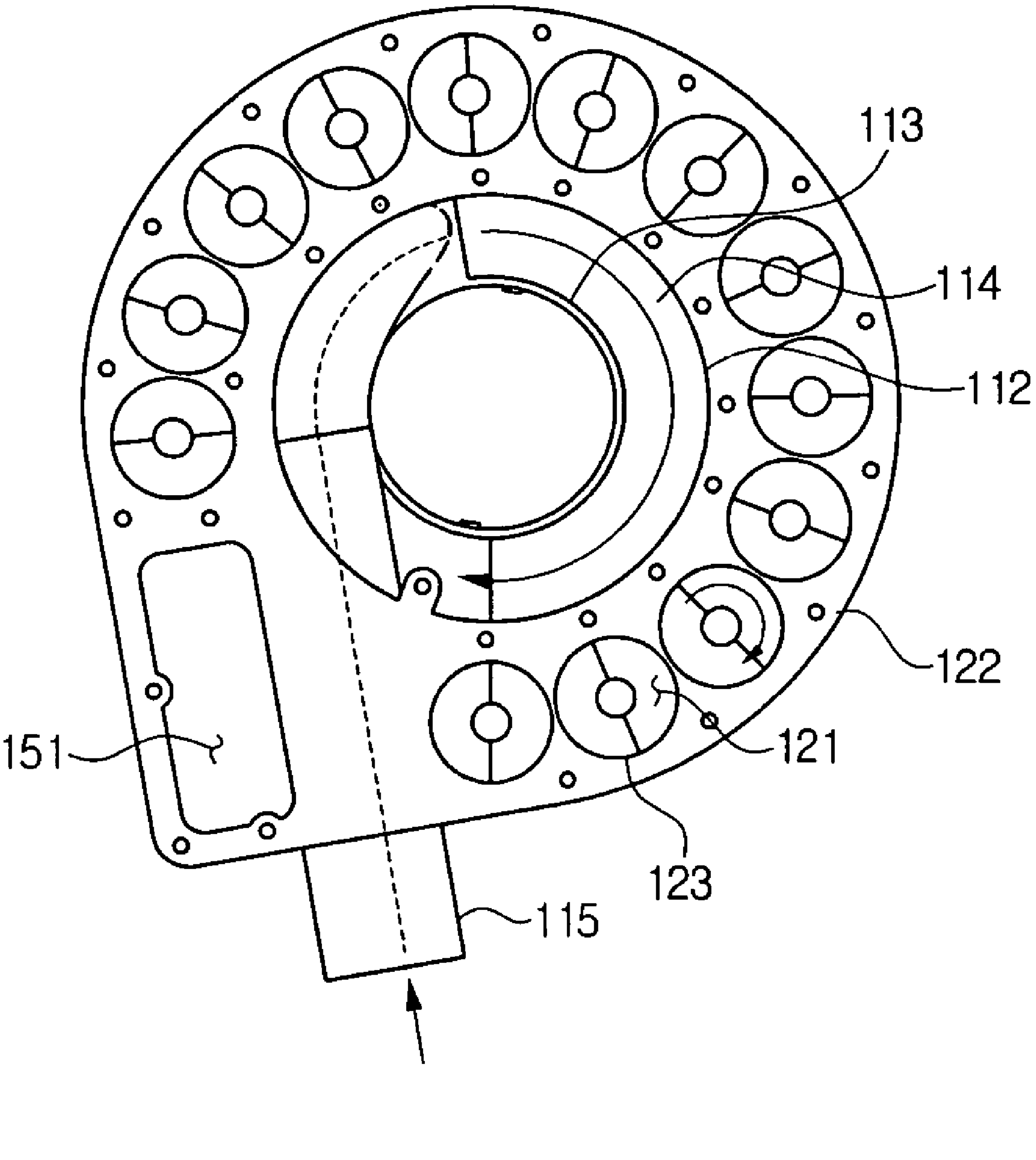
FIG. 5 is a plane view of a cyclone body in FIG. 4.

FIG. 3 is a perspective view of a multi cyclone dirt separating apparatus in accordance with an exemplary embodiment of the present invention, FIG. 4 is an exploded perspective view of FIG. 3 and FIG. 5 is a plane view of a cyclone body in FIG. 4.

Referring to FIG. 3 to FIG. 5, a multi cyclone dirt separating apparatus 100 comprises a cyclone body 110 including a first cyclone chamber 111 and second chambers 121 separating dirt from air drawn in from an exterior in two steps; an inflowing/outflowing cover 130 and a cyclone cover 140 coupled with an upper end of the cyclone body 110; and a dirt collecting case 160 coupled with a lower portion of the cyclone body 110. The multi cyclone dirt separating apparatus 100 further comprises a discharge guide duct 150 for guiding air discharged from the second cyclone chambers 121 toward a lower end of the dirt collecting case 160.

The first cyclone chamber 111 is provided at a center of the cyclone body 110, the air and the dirt drawn in from the exterior produce a whirlpool air current and are separated from each other by centrifugal force in the first cyclone chamber. The first cyclone chamber 111 comprises a cylindrical first chamber outer wall 112 and an air outlet port 113 through which the air is discharged. The chamber outer wall 112 has an upper portion that is penetrated to form an inlet port 115 so that the exterior air flows in the first cyclone chamber 111 through the inlet port 115. The inflowing air is rotated along a guide member 114 and descends in the first cyclone chamber 114. At this time, the centrifugal force is applied relatively to the dirt which is heavier than the air so that the dirt is concentrated and flows on an inner surface of the first chamber outer wall 112, and the dirt is finally collected in the dirt collecting case 160. Since the relative light air receives a small centrifugal force, the air is gathered at a central portion of the first cyclone chamber 111 to produce a whirlwind, and so the air ascends and produces a discharging air current toward the air outlet port 113 and the air is then discharged. Since the dirt may be flow backward by the ascending current of the air, a grill member 116 is provided at a lower end side of the air outlet port 113 for preventing the dirt from flowing backward.

The cyclone body 110 also comprises a second chamber outer wall 122 having a certain thickness and surrounding the first chamber outer wall 112 and a plurality of second cyclone chambers 121 formed in the second chamber outer wall 122 for secondarily separating the dirt from the air discharged from the first cyclone chamber 111. Unlike the first chamber outer wall 112, as shown in the drawings, the second chamber outer wall 122 dos not have a cylindrical shape. One side of the second chamber outer wall 122 is penetrated in the radial direction to form the outlet port 115. The second cyclone chamber 121 is not provided at a predetermined area at which the outlet port 115 is formed. The air flowing into the second cyclone chambers 121 through an air inlet port 123 is rotated and produces a descending air current, and small dirt is separated from the air and then collected in the dirt collecting case 160. The air separated by the centrifugal force as described above again produces an ascending air current and is discharged from the second cyclone chambers 121 through outflow guide passages 132 of the inflowing/outflowing cover 130.

The inflowing/outflowing cover 130 is provided with inflow guide passages 131 and the outflow guide passages 132. The air discharged from the first cyclone chamber 111 through the air outlet port 113 collides with an upper end of the inflowing/outflowing cover 130 and flows in the air inlet 123 along the plurality of inflow guide passages 131. When the inflowing/outflowing cover 130 is coupled with the cyclone body 110, some portion of each outflow guide passage 132 is inserted in the corresponding second cyclone chamber 121. Accordingly, the air and dirt are separated from each other in the second cyclone chambers 121 and the air is then discharged through the outflow guide passages 132.

The cyclone cover 140 is provided at an upper side of the inflowing/outflowing cover 130. The air discharged through the plurality of outflow guide passages 132 is gathered in the cyclone cover 140, and the air gathered in the cyclone cover 140 flows again in the discharge guide duct 150 through a guide duct inlet 154 of the inflowing/outflowing cover 130.

The discharge guide duct 150 guides the air discharged from the second cyclone chambers 121 to a lower end of the dirt collecting case 160. The discharge guide duct 150 comprises a first guide duct 151 provided in the second chamber outer wall 122, a second guide duct 153 provided in the duct collecting case 160 and a guide duct inlet 154 formed at the inflowing/outflowing cover 130. Here, the second chamber outer wall 122 and the dirt collecting case 160 are penetrated by the first guide duct and the second guide duct in a substantially vertical direction, respectively.

The first guide duct 151 communicates with the guide duct inlet 154 having an upper end formed on the inflowing/outflowing cover 130. The first guide duct 151 is formed at a region of the second chamber outer wall 122 at which the second cyclone chamber 12 is not formed and disposed at one side of the inlet port 115. As shown in FIG. 5, the second chamber outer wall 122 is penetrated by the inlet port 115 in the substantially horizontal direction and penetrated by the guide duct inlet 154 in the substantially vertical direction. Accordingly, a flow of the air flown in the inlet port 115 and a flow of the air flown in the first guide duct 151 meet at angles of between about 80° to about 100°, and preferably, at an angle of about 90°. An upper end of the second guide duct 153 contacts a lower end of the first guide duct 151, and a lower end contacts an inlet 230*a* of a motor mounting space 230 (see FIG. 6) installed at a main body 210 of the vacuum cleaner.

The air discharged from the plurality of second cyclone chambers 121 is flowing from each outflow guide passage 132 and then collected in the cyclone cover 140. Thereafter, the collected air collides with an upper end of the cyclone cover 140 and then flown in the guide duct inlet 154. The air is passed through the first and second guide ducts 151 and 153 and discharged to an exterior of the multi cyclone dirt separating apparatus 100.

According to the multi cyclone dirt separating apparatus 100 of the present invention as described above, the discharge guide duct 150 is provided in the second chamber outer wall 122 and the dirt collecting case 160 in the substantially vertical direction and the air discharged from the plurality of second cyclone chambers 121 is guided toward the discharge guide duct 150 so that the air is discharged toward a lower end of the dirt collecting case 160. In the conventional multi cyclone dirt separating apparatus as shown in FIG. 1, the air discharging tube 12 is provided at an upper portion or a side portion of the cyclone cover 18 so that an entire height of the multi cyclone dirt separating apparatus is increased. However, the present invention can embody the multi cyclone dirt separating apparatus having the desired compact structure. According to the present invention, there is the effect that a structure of the vacuum cleaner becomes simple. The detailed description thereon is as follows.

Figure 6:
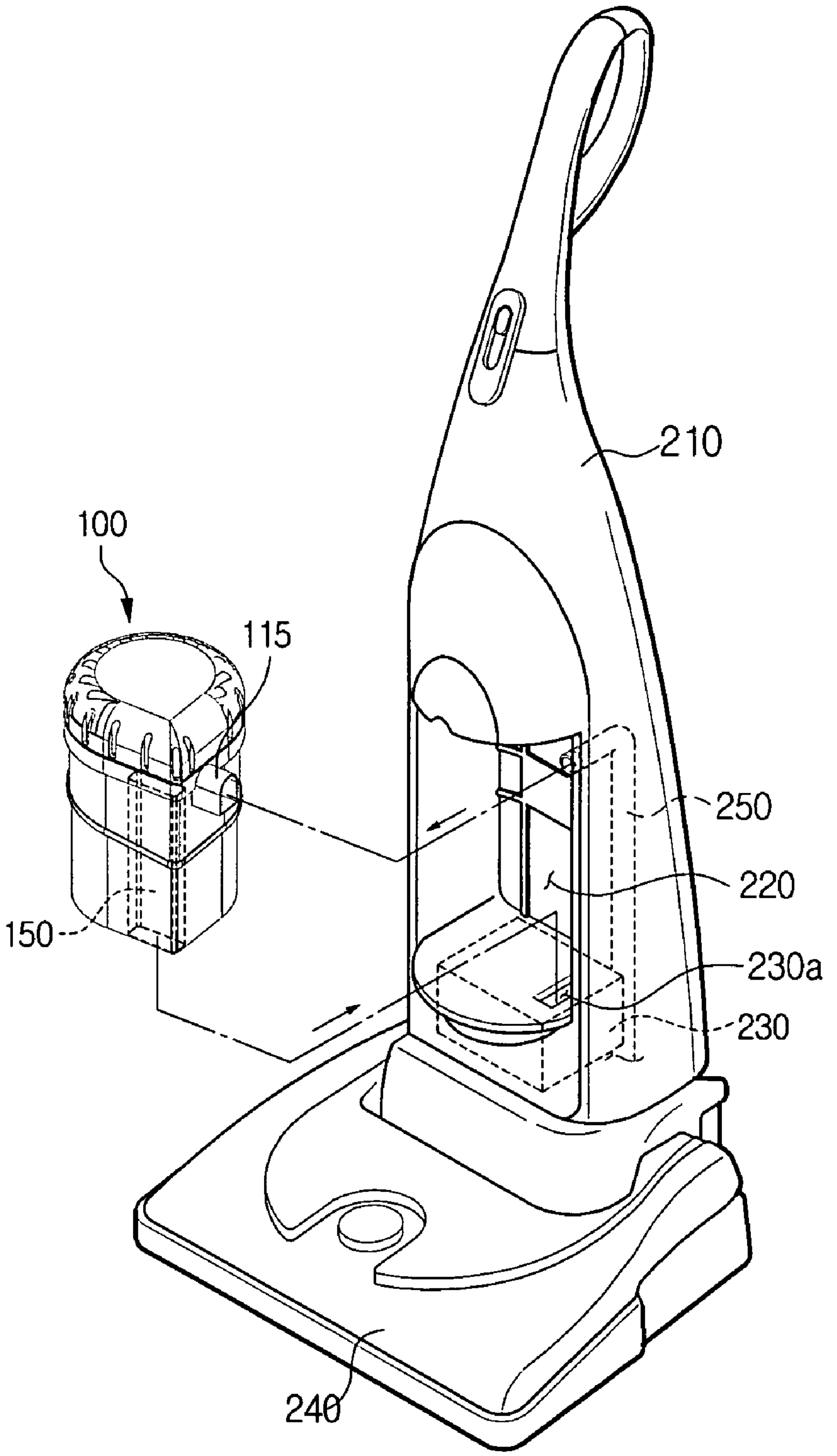
FIG. 6 is a perspective view of an upright-type vacuum cleaner having the multi cyclone dirt separating apparatus in accordance with the exemplary embodiment of the present invention.

FIG. 6 shows an upright-type vacuum cleaner having the multi cyclone dirt separating apparatus in accordance with the embodiment of the present invention. As shown in the drawing, the multi cyclone dirt separating apparatus 100 is provided attachably/detachably at a cyclone mounting section 220 formed on the main body 210 of the vacuum cleaner. And, the motor mounting space 230 in which the motor, used as a suction force generating means, is installed at a lower side of the cyclone mounting section 220. In general, the motor mounting space 230 is provided at a lower side of the main body 210 of the vacuum cleaner since the motor is heavy in weight. An air suction passage 250 is formed at a rear side of the cyclone mounting section 220, an air suction nozzle 240 is in fluid communication with the inlet port 115 of the multi cyclone dirt separating apparatus 100 by the air suction passage.

As shown in FIG. 6, once the multi cyclone dirt separating apparatus 100 is mounted to the cyclone mounting section 220, a lower end of the discharge guide duct 150 is in fluid communication with the motor mounting space 230. As described above, the dirt is removed from the air entered in the multi cyclone dirt separating apparatus 100 through the inlet port 115, the air from which the dirt is removed flows in the discharge guide duct 150, and then is discharged from a lower end of the dirt collecting case 160. The discharged air enters directly in the motor mounting space 230 of the main body 210 of the vacuum cleaner. Here, a direct entrance of the air to the motor mounting space 230 means that the air is not passed through a separate flow passage, but enters directly to the motor mounting space. Accordingly, there is no need to form the air discharge passage 26 (see FIG. 1) for guiding the air discharged from the conventional multi cyclone dirt separating apparatus to the motor mounting space 230 or a length of the air discharge passage 26 can be minimized. Consequently, an inner structure of the main body 210 of the vacuum cleaner becomes simple and a loss of the suction force in the flow passage can be reduced to a minimum.

In the above, the multi cyclone dirt separating apparatus is described as one example. However, the present invention is not necessarily limited thereto. That is, it goes without saying that the present invention is applicable to a single cyclone dirt separating apparatus. In this case, the cyclone body comprises a cyclone chamber for centrifuging dirt from the entered air, an inlet port such as a suction port for making exterior air enter to the cyclone chamber and an air outlet port for discharging the air which does not contain the dirt from the cyclone chamber. And, the dirt collecting case is combined with a lower side of the cyclone body. And, the discharge guide duct is passed through the cyclone body and the dirt collecting case in a substantially vertical direction, and so the air discharged from the outlet port is guided to a lower end of the dirt collecting case. The single cyclone dirt separating apparatus having the above constitution can provide the effects which are the same as those embodied by using the multi cyclone dirt separating apparatus as described above.

On the other hand, this embodiment only shows an example that the cyclone dirt separating apparatus is applied to the upright type vacuum cleaner, it goes without saying that the present invention is not limited thereto and can be applicable to the canister type vacuum cleaner.

According to the present invention, as described above, the air from which the dirt is separated is passed through an interior of the cyclone dirt separating apparatus in a substantially vertical direction and then discharged from a lower end of the dirt collecting case to the motor mounting space of the vacuum cleaner, and so a height of the cyclone dirt separating apparatus is decreased, an inner structure of the vacuum cleaner becomes simple and a loss of pressure can be reduced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dirt separating apparatus comprising:

a cyclone body including a first cyclone chamber and a second cyclone chamber, the first cyclone chamber preliminarily separating dirt from air drawn in from an exterior by a centrifugal force, and the second cyclone chamber secondarily separating dirt from the air discharged from the first cyclone chamber;

an inflowing/outflowing cover provided at an upper end of the cyclone body, the inflowing/outflowing cover having inflow guide passages for guiding the air discharged from the first cyclone chamber to the second cyclone chamber and having outflow guide passages for discharging the air in the second cyclone chamber to an exterior;

a dirt collecting case coupled to a lower end of the cyclone body, the dirt collecting case collecting the dirt separated by the first and second cyclone chambers; and a discharge guide duct passing through the cyclone body and the dirt collecting case, the discharging guide duct guiding the air discharged from the second cyclone chamber through the outflow guide passages toward a motor mounting space.

2. The cyclone dirt separating apparatus according to claim 1, wherein the discharge guide duct penetrates through a side of the cyclone body and the dirt collecting case in a substantially vertical direction.

3. The cyclone dirt separating apparatus according to claim 2, wherein the discharge guide duct has a lower end that contacts an inlet of the motor mounting space.

4. The cyclone dirt separating apparatus according to claim 3, further comprising:

a cyclone cover provided on the inflowing/outflowing cover for gathering the air discharged from the outflow guide passages, wherein the inflowing/outflowing cover has a guide duct inlet for making the air gathered in the cyclone cover enter the discharge guide duct.

5. The cyclone dirt separating apparatus according to claim 4, wherein the discharge guide duct comprises a first guide duct passing through the cyclone body in a substantially vertical direction and communicating with the guide duct inlet, and a second guide duct passing through the dirt collecting case in a substantially vertical direction and communicating with the first guide duct.

6. The cyclone dirt separating apparatus according to claim 5, wherein the cyclone body has the first cyclone chamber provided at a center portion thereof, the second cyclone chambers are disposed at a periphery of the first cyclone chamber at regular intervals, and the first guide duct is formed at a region at which the second cyclone chambers are not provided.

7. The cyclone dirt separating apparatus according to claim 6, further comprising an inlet port passed through the cyclone body in a substantially horizontal direction to make the exterior air enter the first cyclone chamber, the inlet port being formed at a side of the first guide duct.

8. The cyclone dirt separating apparatus according to claim 7, wherein the air in the inlet port has a flow direction that is substantially perpendicular to a flow direction of the air in the first guide duct.

9. A cyclone dirt separating apparatus comprising:

a cyclone body including a cyclone chamber in which dirt is separated from drawn-in air, an inlet port through which the drawn-in air enters the cyclone chamber, and an outlet port through which the drawn-in air is discharged from the cyclone chamber;

an inflowing/outflowing cover provided at an upper end of the cyclone body, the inflowing/outflowing cover having inflow guide passages for guiding the air entering through inlet port to the cyclone chamber and having outflow guide passages for discharging the air in the cyclone chamber to an exterior;

a dirt collecting case coupled to a lower end of the cyclone body for collecting the dirt separated from the drawn-in air; and a discharge guide duct passing through the cyclone body and the dirt collecting case in the substantially vertical direction, the discharging guide duct guiding the air discharged from the cyclone chamber through the outflow guide passages to a lower end of the dirt collecting case.

10. The cyclone dirt separating apparatus according to claim 9, wherein the discharge guide duct has a lower end that contacts an inlet of a motor mounting space of a vacuum cleaner through a lower end thereof.

11. A vacuum cleaner comprising:

a cyclone mounting section;

a main body including a motor mounting space installed at a lower end of the cyclone mounting section; and a suction nozzle coupled with the main body and a cyclone dirt separating apparatus mounted attachably/detachably to the cyclone mounting section, wherein the cyclone dirt separating apparatus comprises a cyclone body including a first cyclone chamber and a plurality of second cyclone chambers, the first cyclone chamber preliminarily separating dirt from air drawn in through the suction nozzle by a centrifugal force, the plurality of second cyclone chambers being disposed at a periphery of the first cyclone chamber for centrifugally separating dirt from the air discharged from the first cyclone chamber;

a dirt collecting case coupled to a lower end of the cyclone body for collecting the dirt separated from the air; and a discharge guide duct being passed through the cyclone body and the dirt collecting case, the discharging guide duct guiding the air discharged from the plurality of second cyclone chambers such that the air directly enters the motor mounting space.

12. The vacuum cleaner according to claim 11, wherein the cyclone dirt separating apparatus further comprises:

an inflowing/outflowing cover provided at an upper end of the cyclone body and provided with inflow guide passages for guiding the air discharged from the first cyclone chamber to the plurality of second cyclone chambers and provided with outflow guide passages for discharging the air in the plurality of second cyclone chambers to an exterior; and a cyclone cover provided on the inflowing/outflowing cover for gathering the air discharged from the outflow guide passages, wherein the inflowing/outflowing cover has a guide duct inlet for making the air gathered in the cyclone cover enter the discharge guide duct.

13. The vacuum cleaner according to claim 12, wherein the discharge guide duct comprises a first guide duct passing through the cyclone body in a substantially vertical direction and communicating with the guide duct inlet and a second guide duct passing through the dirt collecting case in a substantially vertical direction and communicating with the first guide duct.

* * * * *